US012776795B2

(12) United States Patent
Patel

(10) Patent No.: US 12,776,795 B2
(45) Date of Patent: Oct. 27, 2026

(54) SYSTEM FOR SUPPRESSING RADIO INTERFERENCE VIA ACTIVE FILTERING AND MODULATION DETECTION

(71) Applicant: GM Global Technology Operations LLC, Detroit, MI (US)

(72) Inventor: Vipul M. Patel, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 307 days.

(21) Appl. No.: 18/405,236

(22) Filed: Jan. 5, 2024

(65) Prior Publication Data

US 2025/0226845 A1 Jul. 10, 2025

(51) Int. Cl.
*H04B 1/10* (2006.01)

(52) U.S. Cl.
CPC .................................. *H04B 1/1027* (2013.01)

(58) Field of Classification Search
CPC ................................ H04B 1/10; H04B 1/1027
See application file for complete search history.

(56) References Cited

U.S. PATENT DOCUMENTS 8,116,711 B2 * 2/2012 Pervez ................. H03G 3/3052 455/238.1
8,184,741 B2 * 5/2012 He ......................... H04H 40/18 340/681
8,358,995 B2 * 1/2013 Patel .................... H04B 15/025 455/297
8,417,208 B2 * 4/2013 Patel .................... H04B 15/025 455/297
8,885,845 B2 * 11/2014 Honji ..................... G10K 15/04 381/86
9,313,462 B2 * 4/2016 Einecke ................. G06V 20/58
11,211,912 B2 * 12/2021 Yamakaji ............. H03H 7/0115
11,296,739 B2 * 4/2022 Kishimoto ........... H04B 1/1036
11,342,953 B2 * 5/2022 Huebl .................. H04B 1/1027
11,519,400 B2 * 12/2022 Fukasaku ................ H02M 1/14
12,123,229 B2 * 10/2024 Sieg ................... H03K 17/9622
2009/0154727 A1 * 6/2009 Patel .................... H04B 15/025 381/94.1

(Continued)

FOREIGN PATENT DOCUMENTS

EP 2639781 A1 * 9/2013 ............. G08G 1/166
EP 2546085 B1 * 10/2018 ............. B01D 46/10

(Continued)

*Primary Examiner* — Hai V Nguyen
(74) *Attorney, Agent, or Firm* — Honigman LLP; Matthew H. Szalach

(57) ABSTRACT

A method for suppressing radio interference via active filtering and modulation detection includes receiving, at a radio, a signal, and digitizing the signal to generate a digitized signal. The method also includes processing the digitized signal to extract a carrier frequency of the digitized signal and one or more signal characteristics of the digitized signal. Based on the carrier frequency of the digitized signal and the one or more signal characteristics of the digitized signal, the method further includes determining, using a symmetry filtering model, that the one or more signal characteristics of the digitized signal shift linearly with respect to the carrier frequency of the digitized signal, and filtering, using a filter, the signal.

20 Claims, 4 Drawing Sheets

(56) References Cited

U.S. PATENT DOCUMENTS

| | | | | |
|---|---|---|---|---|
| 2011/0053515 | A1* | 3/2011 | Patel | H04B 15/02 455/63.1 |
| 2012/0052813 | A1* | 3/2012 | Patel | H04B 15/025 455/63.1 |
| 2013/0335569 | A1* | 12/2013 | Einecke | G01S 13/867 348/148 |
| 2014/0214676 | A1* | 7/2014 | Bukai | G10L 17/24 705/44 |
| 2020/0119759 | A1* | 4/2020 | Kishimoto | H04B 1/1036 |
| 2021/0058053 | A1* | 2/2021 | Yamakaji | H03H 7/0115 |
| 2021/0088038 | A1* | 3/2021 | Fukasaku | H01F 27/2895 |
| 2023/0003059 | A1* | 1/2023 | Sieg | E05B 81/78 |
| 2024/0039512 | A1* | 2/2024 | Oueslati | H03H 9/6466 |
| 2024/0093705 | A1* | 3/2024 | Hussein | F15D 1/12 |

FOREIGN PATENT DOCUMENTS

| | | | | | |
|---|---|---|---|---|---|
| JP | 2019186653 | A | | 10/2019 | |
| SG | 10201605081 | | * | 8/2016 | H04B 17/309 |
| WO | WO-2025097583 | A1 | * | 5/2025 | G06F 18/10 |

* cited by examiner

SYSTEM FOR SUPPRESSING RADIO INTERFERENCE VIA ACTIVE FILTERING AND MODULATION DETECTION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to radios. In particular, the present disclosure relates to actively filtering noise source interference from electric vehicle propulsion systems. In a hybrid vehicle or electric vehicle, for example, vehicle propulsion systems employ pulse width modulated switching control. These control frequencies are typically in the kilohertz (kHz) range (e.g., less than 10 kHz), and cause harmonic interference in amplitude modulation (AM) frequency bands received by the vehicle's radio. Specifically, AM frequency bands extend from roughly 525 kHz to 1710 kHz in 10 kHz increments, where a switching control frequency operating at 6 kHz may cause interference at 600 kHz (i.e., the hundredth harmonic), 900 kHz (i.e., the control frequency's one hundred fiftieth harmonic), and so forth. While previous attempts have been made to filter out the control frequencies of the vehicle propulsion systems, these systems may include additional processing due to multiple layers of communication between the vehicle radio, filter, communication bus, and the vehicle network.

SUMMARY

One aspect of the disclosure provides a computer-implemented method for suppressing radio interference via active filtering and modulation detection that when executed on data processing hardware causes the data processing hardware to perform operations that include receiving, at a radio, a signal, and digitizing the signal to generate a digitized signal. The operations also include processing the digitized signal to extract a carrier frequency of the digitized signal and one or more signal characteristics of the digitized signal. Based on the carrier frequency of the digitized signal and the one or more signal characteristics of the digitized signal, the operations further include determining, using a symmetry filtering model, that the one or more signal characteristics of the digitized signal shift linearly with respect to the carrier frequency of the digitized signal, and filtering, using a filter, the signal.

Implementations of the disclosure may include one or more of the following optional features. In some implementations, the signal includes a pulse width modulated switching control frequency. In some examples, the radio is disposed within a vehicle. In some implementations, the symmetry filtering model applies a filtering algorithm to the one or more signal characteristics of the digitized signal. In these examples, the filtering algorithm may include digital signal processing, the filtering algorithm identifying patterns of the digitized signal in the frequency domain.

In some implementations, filtering, using the filter, the signal includes applying selective digital notch filters to the digitized signal. In some examples, the one or more signal characteristics of the digitized signal are in the frequency domain. In some implementations, the carrier frequency of the digitized signal is 10 kilohertz.

In some examples, the operations further include receiving, at the radio, a subsequent signal and digitizing the subsequent signal to generate a digitized subsequent signal. Here, the operations also include processing the digitized subsequent signal to extract a carrier frequency of the digitized subsequent signal and one or more signal characteristics of the digitized subsequent signal. Based on the carrier frequency of the digitized subsequent signal and the one or more signal characteristics of the digitized subsequent signal, these operations also include determining, using the symmetry filtering model, that the one or more signal characteristics of the digitized subsequent signal shift symmetrically with respect to the carrier frequency of the digitized subsequent signal, and allowing the subsequent signal. In some implementations, the subsequent signal includes an amplitude modified signal.

Another aspect of the disclosure provides a system for suppressing radio interference via active filtering and modulation detection that includes data processing hardware and memory hardware in communication with the data processing hardware. The memory hardware stores instructions that when executed by the data processing hardware cause the data processing hardware to perform operations that include receiving, at a radio, a signal, and digitizing the signal to generate a digitized signal. The operations also include processing the digitized signal to extract a carrier frequency of the digitized signal and one or more signal characteristics of the digitized signal. Based on the carrier frequency of the digitized signal and the one or more signal characteristics of the digitized signal, the operations further include determining, using a symmetry filtering model, that the one or more signal characteristics of the digitized signal shift linearly with respect to the carrier frequency of the digitized signal, and filtering, using a filter, the signal.

This aspect may include one or more of the following optional features. In some implementations, the signal includes a pulse width modulated switching control frequency. In some examples, the radio is disposed within a vehicle. In some implementations, the symmetry filtering model applies a filtering algorithm to the one or more signal characteristics of the digitized signal. In these examples, the filtering algorithm may include digital signal processing, the filtering algorithm identifying patterns of the digitized signal in the frequency domain.

In some implementations, filtering, using the filter, the signal includes applying selective digital notch filters to the digitized signal. In some examples, the one or more signal characteristics of the digitized signal are in the frequency domain. In some implementations, the carrier frequency of the digitized signal is 10 kilohertz.

In some examples, the operations further include receiving, at the radio, a subsequent signal and digitizing the subsequent signal to generate a digitized subsequent signal. Here, the operations also include processing the digitized subsequent signal to extract a carrier frequency of the digitized subsequent signal and one or more signal characteristics of the digitized subsequent signal. Based on the carrier frequency of the digitized subsequent signal and the one or more signal characteristics of the digitized subsequent signal, these operations also include determining, using the symmetry filtering model, that the one or more signal characteristics of the digitized subsequent signal shift symmetrically with respect to the carrier frequency of the digitized subsequent signal, and allowing the subsequent signal. In some implementations, the subsequent signal includes an amplitude modified signal.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
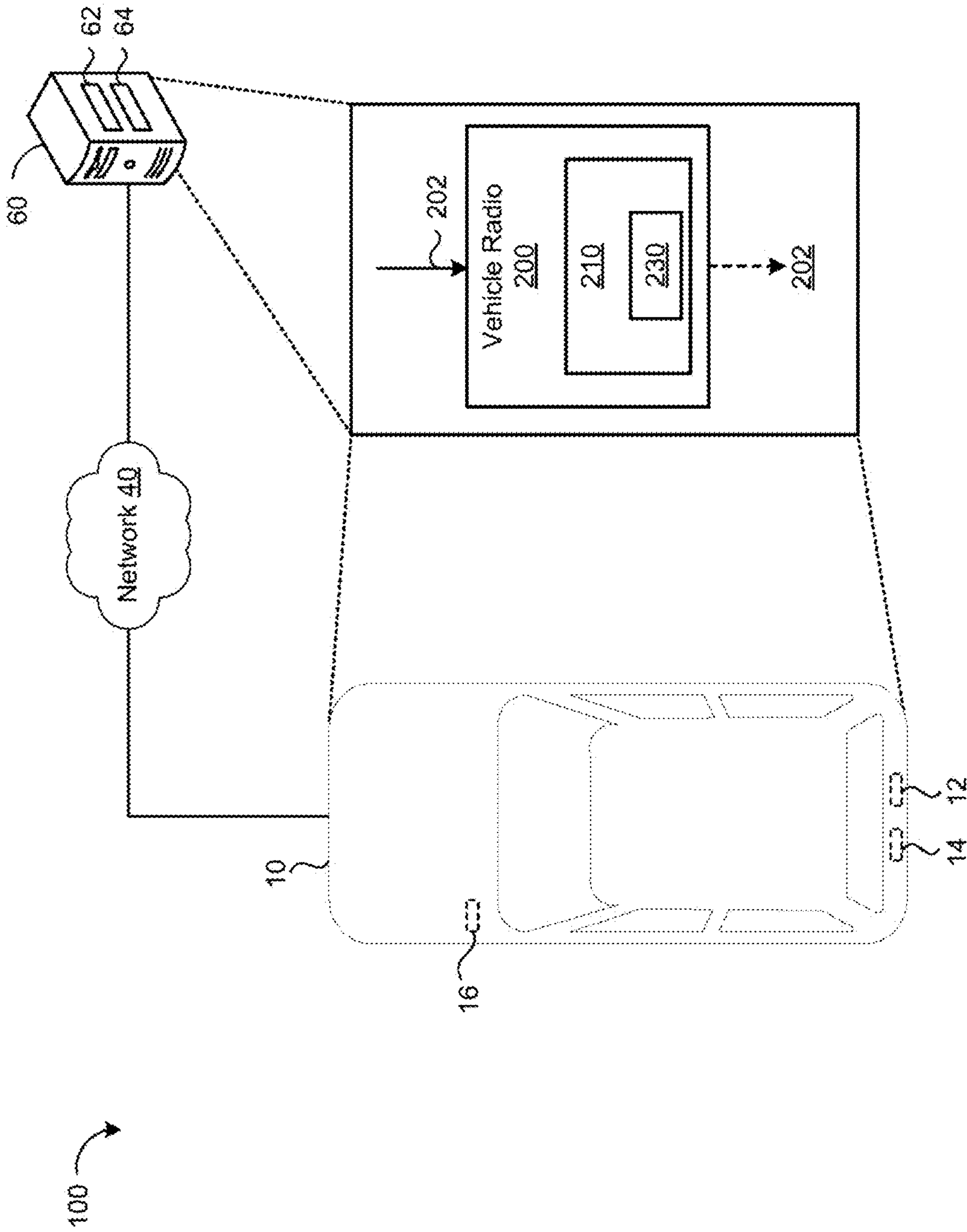
FIG. 1 is a schematic view of an example system for suppressing radio interference via active filtering and modulation detection.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a." "an," and "the" may be intended to include the plural forms as well, unless the context clearly indicates otherwise. The terms "comprises." "comprising." "including." and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on." "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second." "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first." "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC): a digital, analog, or mixed analog/digital discrete circuit: a digital, analog, or mixed analog/digital integrated circuit: a combinational logic circuit: a field programmable gate array (FPGA): a processor (shared, dedicated, or group) that executes code: memory (shared, dedicated, or group) that stores code executed by a processor: other suitable hardware components that provide the described functionality: or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application." an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM. EEPROM, and flash memory devices: magnetic disks, e.g., internal hard disks or removable disks: magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube). LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well: for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user: for example, by sending web pages to a web browser on a user's client device in response to requests received from the web browser.

FIG. 1 illustrates an example system 100 including a vehicle 10 and/or a remote system 60 in communication with the vehicle 10 via a network 40. The vehicle 10 and/or the remote system 60 includes a radio 200 that executes an active filtering and modulation detection system 204 (FIG. 2) that filters harmonics from noisy sources within the vehicle 10 that may interfere with the amplitude modulated (AM) radio. In particular, the radio 200 may receive signals 202 from a desired source (e.g., AM radio signals 202R) as well as signals 202 from noise (e.g., noise signals 202N) generated by components within the vehicle 10 and/or within the environment surrounding the vehicle 20. The active filtering and modulation detection system 204 is configured to receive the signals 200 and selectively apply a filter 240 to noise signals 202N while allowing radio signals 202R.

In the examples shown, the active filtering and modulation detection system 204 is implemented within the radio 200 of the vehicle 10. However, the active filtering and modulation detection system 204 can be implemented on other devices (e.g., computing devices in communication with the vehicle 10), such as, without limitation, a smart phone, tablet, smart display, desktop/laptop, smart watch, smart appliance, headphones, smart glasses/headset, or a vehicle infotainment device. The vehicle 10 includes data processing hardware 12 and memory hardware 14 storing instructions that when executed on the data processing hardware 12 cause the data processing hardware 14 to perform operations. The remote system 60 (e.g., server, cloud computing environment) also includes data processing hardware 62 and memory hardware 64 storing instructions that when executed on the data processing hardware 62 cause the data processing hardware 62 to perform operations. In some examples, execution of the active filtering and modulation detection system 204 is shared across the radio 200 within the vehicle 10 and the remote system 60. As described in greater detail below with reference to FIG. 2, the active filtering and modulation detection system 204 executing on the vehicle 10 (e.g., the radio 200) and/or the remote system 60 executes a digitizer module 210, an extraction module 220, and a symmetry filtering model 230 that selectively applies a filter 240 to the received signals 202. The active filtering and modulation detection system 204 is configured to receive signals 202 (i.e., AM signals 202R, noise signals 202N) for the vehicle 10 and based on individual frequency components of the received signal 202, selectively apply the filter 240 to the signal 202.

The radio 200 of the vehicle 10 may be configured to receive and demodulate signals 202, such as AM signals 202R. However, the vehicle 10 may also include an electric propulsion system 16 that employs a pulse modulated switching control that generates a pulse width modulated switching control signal 202N that interferes with the AM signals 202R. These noise signals 202N are typically in the kilohertz (kHz) range (e.g., less than 10 kHz), and cause harmonic interference in the frequency bands of the AM signals 202R received by the vehicle's radio 200. Specifically, the frequency bands of the AM signals 202R extend from roughly 525 KHz to 1710 KHz in 10 kHz increments, while a switching control frequency operating at 6 kHz may cause noise signals 202N that cause interference at 600 kHz (i.e., the hundredth harmonic). 900 kHz (i.e., the control frequency's one hundred fiftieth harmonic), etc. By detecting the frequency characteristics of a received signal 202, the active filtering and modulation detection system 204 may selectively apply a filter to remove/suppress noise signals 202N to prevent interference with AM signals 202R and other desired signals 202R.

Figure 2:
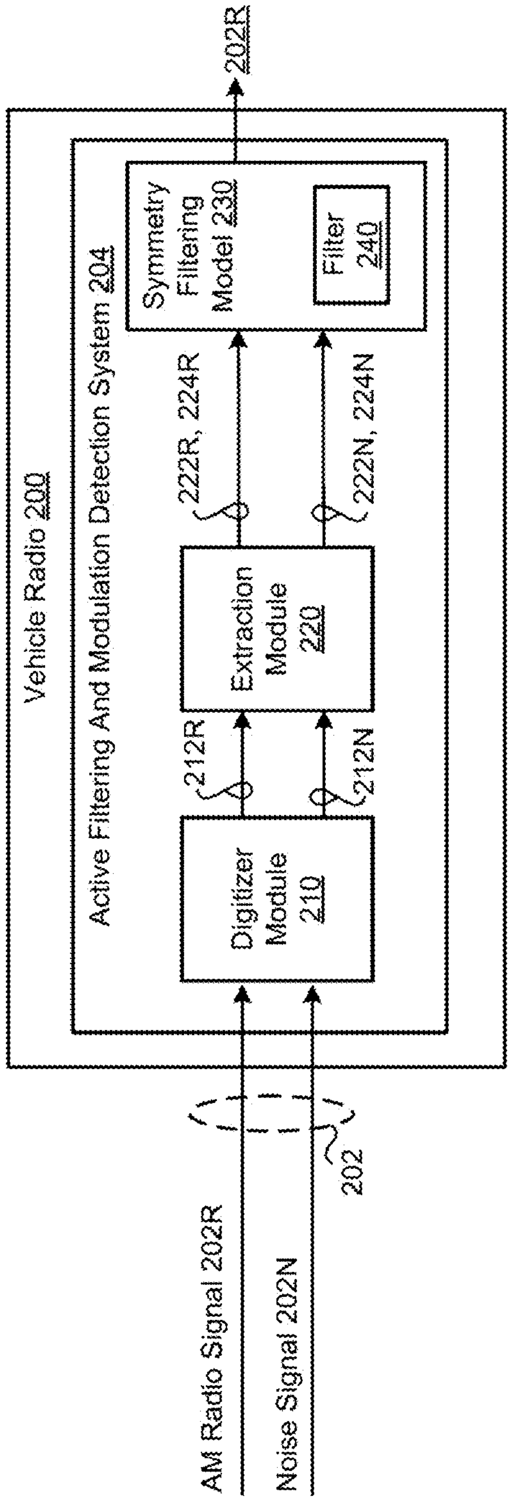
FIG. 2 is a schematic view of example components of the system of FIG. 1.

Referring to FIG. 2, the vehicle executes the active filtering and modulation detection system 204 that receives, as input, signals 202 and selectively filters the signal 202 based on whether the signal 202 is a radio signal 202R or a noise signal 202N without calculating the frequency and harmonic bands of the noise signal 202N. The active filtering and modulation detection system 204 further includes the digitizer module 210, the extraction module 220, and the symmetry filtering model 230 that selectively applies the filter 240. The digitizer module 210 is configured to receive, as input, the signal 202 and digitize the signal 202 to generate a digitized signal 212. The digitizer 210 may include an RF digitizer configured to receive an analogue signal 202 and convert the signal 202 into an equivalent digital signal for additional processing and storage.

Figure 3A:
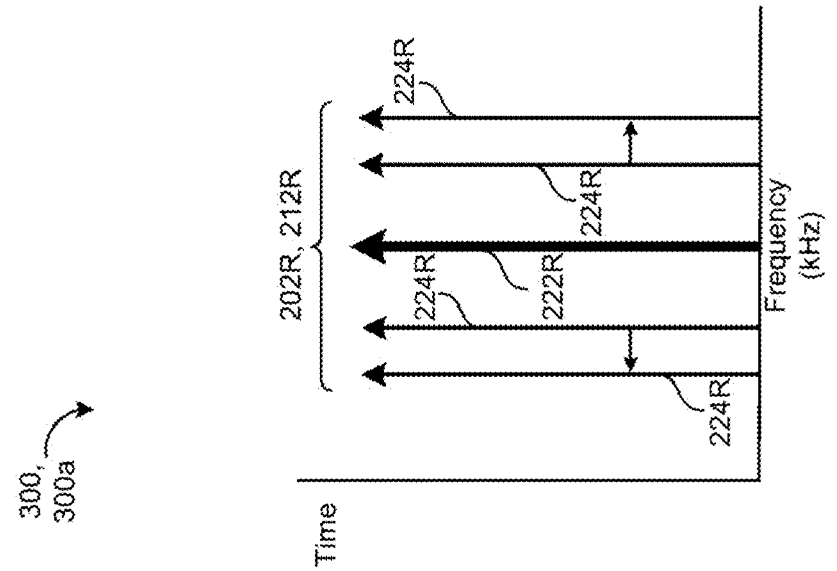
FIGS. 3A and 3B are schematic views of digitized signals.

The extraction module 220 is configured to receive the digitized signal 212 generated/output by the digitizer module 210 and process the digitized signal 212 to extract a carrier frequency 222 of the digitized signal 212 and one or more signal characteristics 224 of the digitized signal 212. The extraction module 220 may apply digital signal processing (DSP) techniques to the digitized signal 212 to identify individual signal characteristics 224 of the received signal 202. In particular, the individual signal characteristics 224 may include individual frequency components such as how the frequency of the signal 202 is modulated (i.e., in the frequency domain) as the signal 202 tracks over time. For example, referring to FIGS. 3A and 3B, schematic views 300*a*, 300*b* show a digitized signal 212 in the frequency domain (e.g., in kHz) as the digitized signal 212 is tracked over time. Here, the frequency of the digitized signal 212 is set on an x-axis while a y-axis represents the time that the digitized signal 212 is tracked/received. With particular reference to FIG. 3A, a radio signal 202R (e.g., an AM radio signal 202R) is processed by the extraction module 220. As shown, the extraction module 220 extracts a carrier frequency 222R of the digitized radio signal 212R as well as a signal characteristic 224R of the digitized radio signal 212R. Here, the signal characteristic 224R shifts away from the carrier frequency 222R symmetrically such that the spacing changes. For example, the signal characteristic 224R may shift from +/−1 kHz to +/−1.2 KHz away from the carrier frequency 222R over time.

Figure 3B:
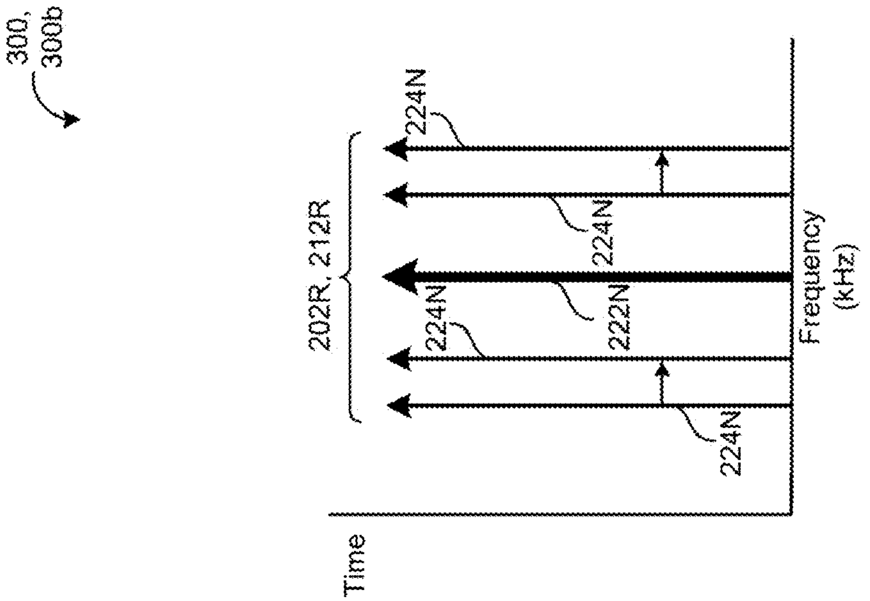

In contrast, with reference to FIG. 3B, the noise signal 202N (e.g., noise signal 202N generated by the electric propulsion system 16) is processed by the extraction module 220. Here, the extraction module extracts a carrier frequency 222N of the digitized noise signal 212N as well as a signal characteristic 224N of the digitized noise signal 212N. Here, the signal characteristic 224N shifts away from the carrier frequency 222N linearly. Put another way; the signal characteristic 224 of the digitized noise signal 212N maintains a consistent spacing around the carrier frequency 222N. For example, the signal characteristic 224N may shift from 10 to 10.2 kHz away from the carrier frequency 222N of the digitized noise signal 212N over time.

Referring again to FIG. 2, the symmetry filter model 230 is configured to receive the carrier frequency 222 and the one or more signal characteristics 224 extracted by the extraction module 220 and identify whether the one or more signal characteristics 224 shift linearly or symmetrically with respect to the carrier frequency 222. The symmetry filtering model 230 may apply a filtering algorithm to the one or more signal characteristics 224 of the digitized signal 212. For example, the filtering algorithm may employ DSP techniques to identify patterns of the digitized signal 212 in the frequency domain, and apply a notch filter 240) to remove interference of noise signals 202N from radio signals 202R. The patterns in the digitized signal 212 may include a type of change in the signal 202, a spacing of the modulated signal 202, or how the modulated signal 202 moves in the frequency domain. Notably, when the symmetry filter model 230 determines that the one or more signal characteristics 224 of the digitized signal 212 shift linearly with respect to the carrier frequency 222, the symmetry filter model 230 identifies the signal 202 as a noise signal 202N and filters/suppresses, using the filter 240, the signal 202N. Conversely, when the symmetry filter model 230 determines that the one or more signal characteristics 224 of the digitized signal 212 shift symmetrically with respect to the carrier frequency 222, the symmetry filter model 230 identifies the signal 202 as a radio signal 202R and does not filter the signal 202R (i.e., allows the signal 202R to be further processed/played).

Figure 4:
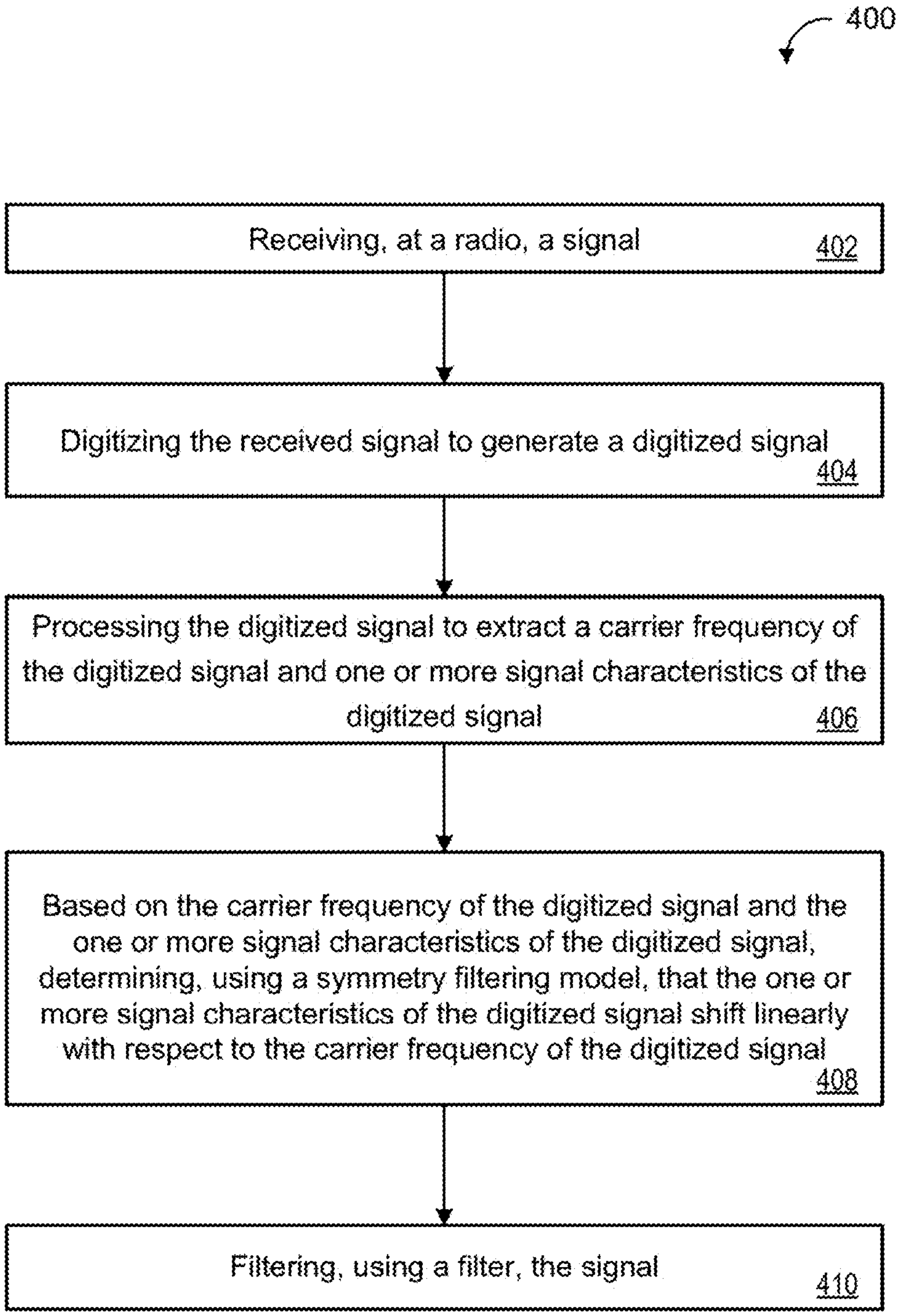
FIG. 4 is a flowchart of an example arrangement of operations for a method of suppressing radio interference via active filtering and modulation detection.

FIG. 4 includes a flowchart of an example arrangement of operations for a method 400 of suppressing radio interference via active filtering and modulation for a vehicle 10. At operation 402, the method 400 includes receiving, at a radio 200, a signal 202. The signal 202 may be an AM radio signal 202R, or a nose signal 202N. At operation 404, the method 400 includes digitizing the received signal 202 to generate a digitized signal 212.

At operation 406, the method 400 further includes processing the digitized signal 212 to extract a carrier frequency 222 of the digitized signal 212 and one or more signal characteristics 224 of the digitized signal 212. Based on the carrier frequency 222 of the digitized signal 212 and the one or more signal characteristics 224 of the digitized signal 212, the method 400 also includes, at operation 408, determining, using a symmetry filtering model 230, that the one or more signal characteristics 224 of the digitized signal 212 shift linearly with respect to the carrier frequency 224 of the digitized signal 212. At operation 410, the method also includes filtering, using a filter 240, the signal 202.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A computer-implemented method when executed on data processing hardware causes the data processing hardware to perform operations comprising:

receiving, at a radio, a signal comprising a noise signal component generated by an electric propulsion system of a vehicle;

digitizing the signal to generate a digitized signal;

processing the digitized signal to extract a carrier frequency of the digitized signal and one or more signal characteristics of the digitized signal;

based on the carrier frequency of the digitized signal and the one or more signal characteristics of the digitized signal, determining, using a symmetry filtering model, that the one or more signal characteristics of the digitized signal shift linearly with respect to the carrier frequency of the digitized signal;

based on determining that the one or more signal characteristics of the digitized signal shift linearly with respect to the carrier frequency of the digitized signal, determining that the signal has the noise signal component; and based on determining that the signal has the noise signal component, filtering, using a filter, the signal to suppress the noise signal component.

2. The method of claim 1, wherein the signal includes a pulse width modulated switching control frequency.

3. The method of claim 1, wherein the radio is disposed within the vehicle.

4. The method of claim 1, wherein the symmetry filtering model applies a filtering algorithm to the one or more signal characteristics of the digitized signal.

5. The method of claim 4, wherein the filtering algorithm includes digital signal processing, the filtering algorithm identifying patterns of the digitized signal in the frequency domain.

6. The method of claim 1, wherein filtering, using the filter, the signal comprises applying selective digital notch filters to the digitized signal.

7. The method of claim 1, wherein the one or more signal characteristics of the digitized signal are in the frequency domain.

8. The method of claim 1, wherein the carrier frequency of the digitized signal is 10 kilohertz.

9. The method of claim 1, wherein the operations further comprise:

receiving a subsequent signal;

digitizing the subsequent signal to generate a digitized subsequent signal;

processing the digitized subsequent signal to extract a carrier frequency of the digitized subsequent signal and one or more signal characteristics of the digitized subsequent signal;

based on the carrier frequency of the digitized subsequent signal and the one or more signal characteristics of the digitized subsequent signal, determining, using the symmetry filtering model, that the one or more signal characteristics of the digitized subsequent signal shift symmetrically with respect to the carrier frequency of the digitized subsequent signal; and allowing the subsequent signal.

10. The method of claim 9, wherein the subsequent signal includes an amplitude modified signal.

11. A system comprising:

data processing hardware; and memory hardware in communication with the data processing hardware, the memory hardware storing instructions that when executed on the data processing hardware cause the data processing hardware to perform operations comprising:

receiving, at a radio, a signal comprising a noise signal component generated by an electric propulsion system of a vehicle;

digitizing the signal to generate a digitized signal;

processing the digitized signal to extract a carrier frequency of the digitized signal and one or more signal characteristics of the digitized signal;

based on the carrier frequency of the digitized signal and the one or more signal characteristics of the digitized signal, determining, using a symmetry filtering model, that the one or more signal characteristics of the digitized signal shift linearly with respect to the carrier frequency of the digitized signal;

based on determining that the one or more signal characteristics of the digitized signal shift linearly with respect to the carrier frequency of the digitized signal, determining that the signal has the noise signal component; and based on determining that the signal has the noise signal component, filtering, using a filter, the signal to suppress the noise signal component.

12. The system of claim 11, wherein the signal includes a pulse width modulated switching control frequency.

13. The system of claim 11, wherein the radio is disposed within the vehicle.

14. The system of claim 11, wherein the symmetry filtering model applies a filtering algorithm to the one or more signal characteristics of the digitized signal.

15. The system of claim 14, wherein the filtering algorithm includes digital signal processing, the filtering algorithm identifying patterns of the digitized signal in the frequency domain.

16. The system of claim 11, wherein filtering the signal comprises applying selective digital notch filters to the digitized signal.

17. The system of claim 11, wherein the one or more signal characteristics of the digitized signal are in the frequency domain.

18. The system of claim 11, wherein the carrier frequency of the digitized signal is 10 kilohertz.

19. The system of claim 11, wherein the operations further comprise:

receiving a subsequent signal;

digitizing the subsequent signal to generate a digitized subsequent signal;

processing the digitized subsequent signal to extract a carrier frequency of the digitized subsequent signal and one or more signal characteristics of the digitized subsequent signal;

based on the carrier frequency of the digitized subsequent signal and the one or more signal characteristics of the digitized subsequent signal, determining, using the symmetry filtering model, that the one or more signal characteristics of the digitized subsequent signal shift symmetrically with respect to the carrier frequency of the digitized subsequent signal; and allowing the subsequent signal.

20. The system of claim 19, wherein the subsequent signal includes an amplitude modified signal.

* * * * *